(12) United States Patent
Ryan

(10) Patent No.: US 8,397,964 B2
(45) Date of Patent: Mar. 19, 2013

(54) BAGGAGE SYSTEM FOR A MOTORCYCLE

(76) Inventor: Stephen L. Ryan, San Jose, CA (US)

( * ) Notice: Subject to any disclaimer, the term of this patent is extended or adjusted under 35 U.S.C. 154(b) by 816 days.

(21) Appl. No.: 11/753,540

(22) Filed: May 24, 2007

(65) Prior Publication Data

US 2008/0290124 A1 Nov. 27, 2008

(51) Int. Cl.
*B62J 7/00* (2006.01)

(52) U.S. Cl. ......... 224/413; 224/463; 224/583; 224/585

(58) Field of Classification Search .................. 224/413, 224/427, 438, 463, 583, 585
See application file for complete search history.

(56) References Cited

U.S. PATENT DOCUMENTS

| 2,553,739 | A | * | 5/1951 | Ashdowne | 224/441 |
| 4,003,508 | A | * | 1/1977 | Hoops | 224/419 |
| 4,345,703 | A | * | 8/1982 | Allen | 224/438 |
| 4,491,258 | A | * | 1/1985 | Jones | 224/153 |
| 4,836,428 | A | * | 6/1989 | Evans et al. | 224/673 |
| 5,405,068 | A | * | 4/1995 | Lovett | 224/153 |
| 5,628,443 | A | * | 5/1997 | Deutsch | 224/583 |
| 5,676,296 | A | * | 10/1997 | Masters | 224/653 |
| 5,729,869 | A | * | 3/1998 | Anscher | 24/3.1 |
| 5,743,447 | A | * | 4/1998 | McDermott | 224/153 |
| 5,873,504 | A | * | 2/1999 | Farmer | 224/576 |
| 5,961,017 | A | * | 10/1999 | Mehler | 224/576 |
| 6,123,239 | A | * | 9/2000 | Lovitt | 224/413 |
| 6,216,926 | B1 | * | 4/2001 | Pratt | 224/153 |
| 6,299,042 | B1 | * | 10/2001 | Smith | 224/431 |
| 6,533,152 | B1 | * | 3/2003 | Dischler | 224/413 |
| 6,547,114 | B2 | * | 4/2003 | Smith | 224/413 |
| 6,802,440 | B1 | * | 10/2004 | Stowell | 224/413 |
| 7,124,921 | B1 | * | 10/2006 | Hubbell | 224/148.2 |
| 7,255,252 | B2 | * | 8/2007 | Lovett | 224/585 |
| 2002/0053583 | A1 | * | 5/2002 | Aldrich | 224/413 |
| 2003/0183669 | A1 | * | 10/2003 | Cameron | 224/585 |
| 2004/0011840 | A1 | * | 1/2004 | Lovett | 224/584 |
| 2005/0161483 | A1 | * | 7/2005 | Krohn et al. | 224/413 |
| 2007/0175941 | A1 | * | 8/2007 | Berry et al. | 224/583 |

* cited by examiner

*Primary Examiner* — Justin Larson
(74) *Attorney, Agent, or Firm* — Haynes and Boone, LLP

(57) ABSTRACT

A baggage system including a first bag supported by a rigid frame may be secured by anchoring straps to a luggage rack or a passenger's back rest of a motorcycle with wrap-around straps. In addition, fasteners are provided on a surface of the first bag to provide corresponding attaching points to fasteners on a second bag. As a result, two-bag system is formed and secured around the passenger seat rest of a motorcycle. Each of the first and the second bag provides attachment structures for attaching front pouches, side pouches and cold-drink pouches. The cold-drink pouch is insulated for cold drinks.

15 Claims, 8 Drawing Sheets

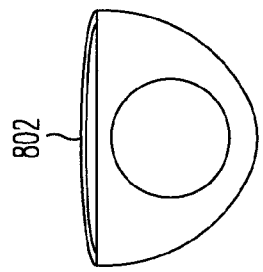
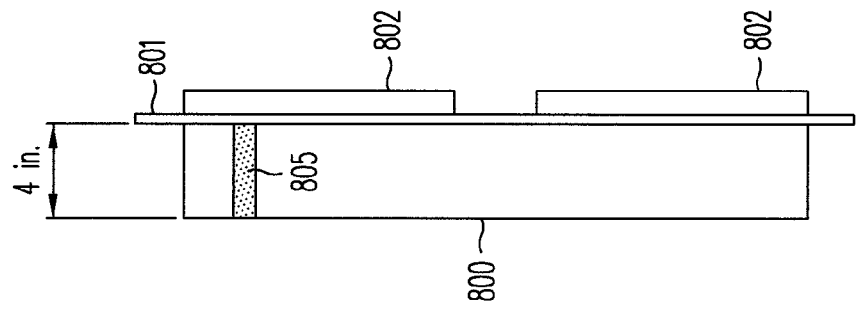
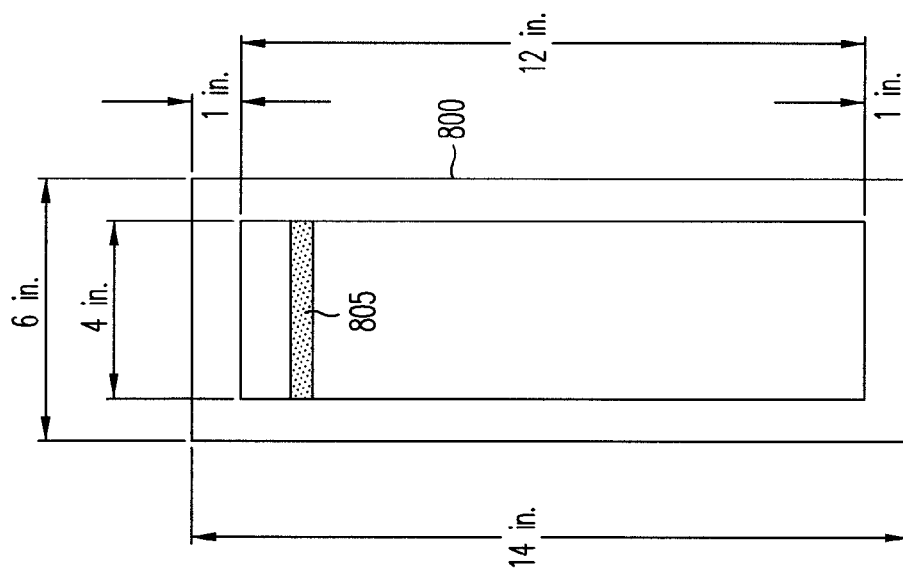

BAGGAGE SYSTEM FOR A MOTORCYCLE

BACKGROUND OF THE INVENTION

1. Field of the Invention

The present invention relates to a novel baggage system for a motorcycle.

2. Discussion of the Related Art

Bags known as "tank bags" have been used with motorcycles, and are often magnetically mounted onto the body of the motorcycle. However, improperly mounted tank bags may damage the paint on the motorcycle. Other bags known as "saddle bags" have also been used with motorcycles. Saddle bags are typically affixed behind a motorcycle seat and are draped on either side of the motorcycle. However, saddle bags may damage the seat to which it is affixed. The storage capacities of these bags are also minimal because of their limited size.

SUMMARY

In one embodiment, the present invention provides one or more bags with options for front pouches, side pouches, and cold drink pouches. The bags may be secured onto a luggage rack of a motorcycle by anchor-straps, which prevent the bag from lifting up off the luggage rack. The bags may also be secured to the passenger's back rest of a motorcycle by wrap-around straps, which prevent the bags from sliding in the direction of motion of the motorcycle. The bags may include a primary bag and a secondary bag secured to each other by metal clips.

Each bag of the present invention may also include one or more front pouches secured to the front panel of the bag through front-straps, and one or more side pouches secured to the side panel of the bag through side-straps. Each bag may also include one or more cold drink pouches for storing or holding a cold drink. Self-repairing zipper may be used to provide access and to secure contents of each bag or pouch. Each bag may also include a carrying handle.

While the bags of the present invention are most suited for use in motorcycles, such bags can also be used with any motor vehicle that has a luggage rack or a seat with a passenger's back rest.

The present invention is better understood upon consideration of the detailed description below in conjunction with the drawings.

BRIEF DESCRIPTION OF THE DRAWINGS

The above and other features of the present invention are described in reference to the certain exemplary embodiments thereof with reference to the attached drawings:

FIGS. 8(a)-8(c) show front, side and top views of cold-drink pouch 800, according to one embodiment of the present invention.

DETAILED DESCRIPTION OF THE INVENTION

Figure 1:
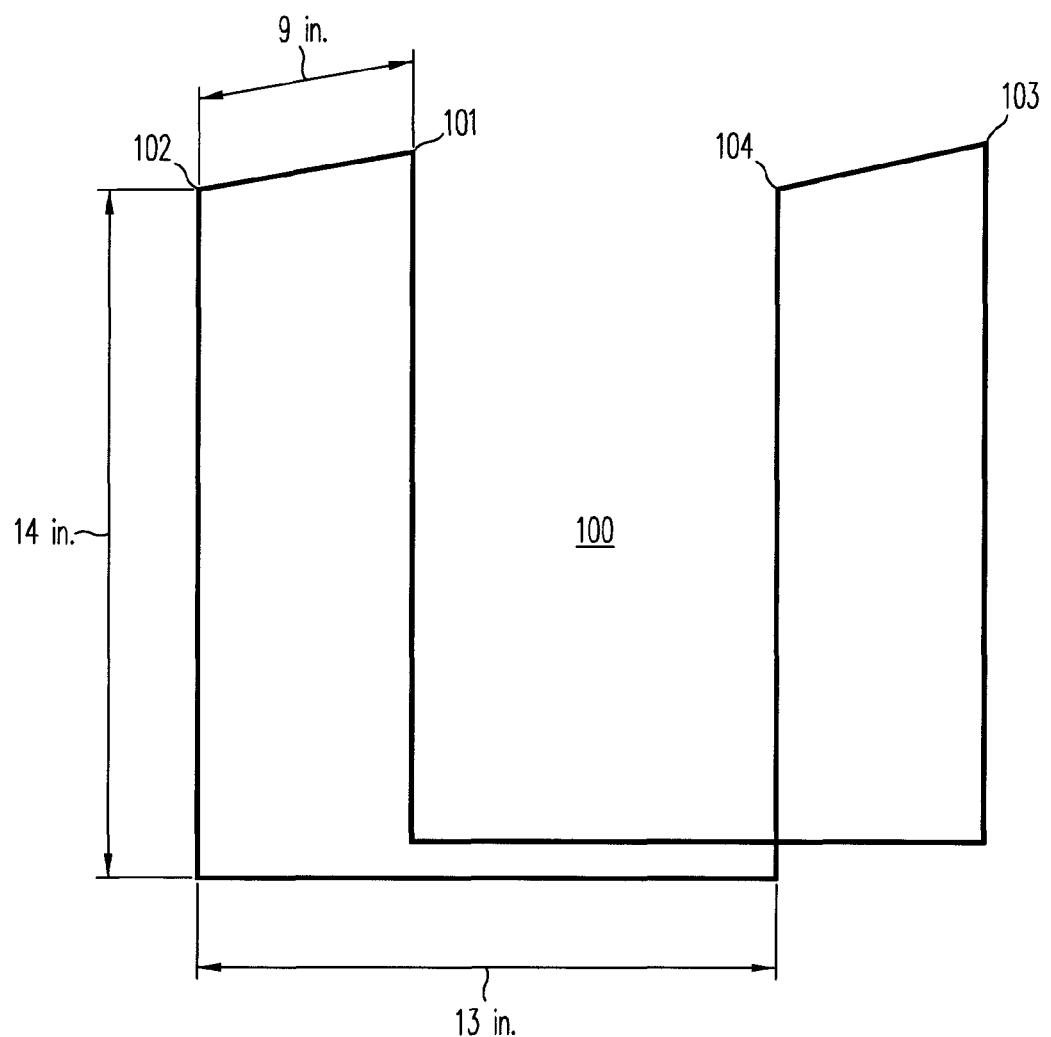
FIG. 1 show rigid frame 100 which provides structural support for a bag, according to one embodiment of the present invention.

FIG. 1 shows rigid frame 100 that provides structural support for a bag in the baggage system of the present invention. Rigid frame 100 is preferably formed using 0.25-inch solid aluminum rods, with top rounded corners 101-104. Rigid frame 100 is sewn between the outer material of the bag and the waterproof inside lining of the bag.

Figure 2:
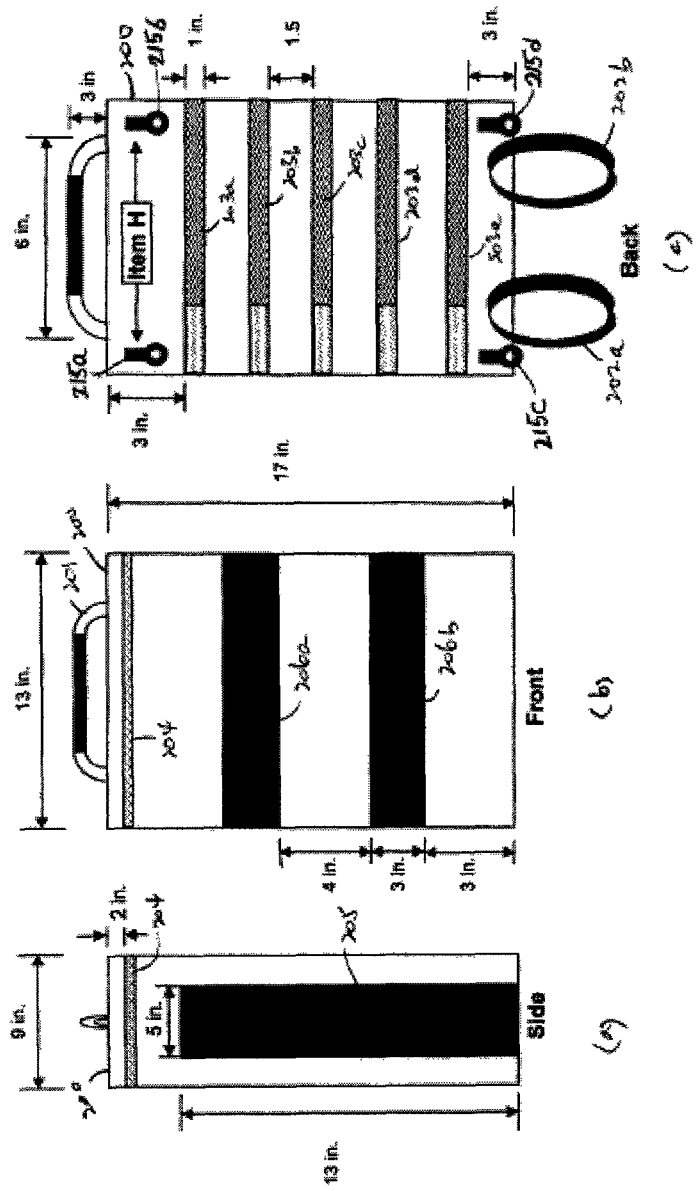
FIGS. 2(a)-2(c) show side, front and back panels of primary bag 200, in accordance with one embodiment of the present invention.

FIGS. 2(a)-2(c) show side, front and back panels of primary bag 200, in accordance with one embodiment of the present invention. In this embodiment, for example, primary bag 200 has dimensions 17 inches by 13 inches by 9 inches. Other suitable sizes are possible. As shown in FIG. 2(c), primary bag 200 includes handle 201, anchor-straps 202a and 202b, and wrap-around straps 203a-203e. Anchor-straps 202a and 202b, which are provided for wrapping around the metal bars of a baggage rack of a motorcycle, prevent the bag from lifting up off the luggage rack. Wrap-around straps 203a-203e (preferably formed of webbing material) are designed for wrapping around a passenger's back rest of a motorcycle to prevent the bag from moving in the direction of travel. Self-repairing zipper 204, which is provided across the front panel and the side panels of primary bag 200, allows access to the inside of primary bag 200 and secures its contents while in motion. In one embodiment, the outer material of primary bag 200 is preferably lamb skin leather. Inside the bag, a waterproof lining is preferably provided. A suitable material for the waterproof lining may be, for example, plastic. As discussed above, a rigid frame (e.g., rigid frame 100 of FIG. 1) provides structural support for primary bag 100.

Both side panels of primary bag 200 may be made substantially the same. As shown in FIG. 2(a), each side panel of primary bag 200 is provided side-strap 205 for securing one or more side pouches to a side panel of primary bag 200. As shown in FIG. 2(b), on the front panel, front-straps 206a and 206b are provided to secure front pouches. Side strap 205 and 15 front-straps 206a and 206b are preferably made from webbing material. As shown in FIG. 2(c), a ring (215a, 215b, 215c, 215d) is attached to each corner of the back panel of the primary bag 200 to allow a secondary bag to be attached by means of clips (preferably, metal clips).

Figure 3:
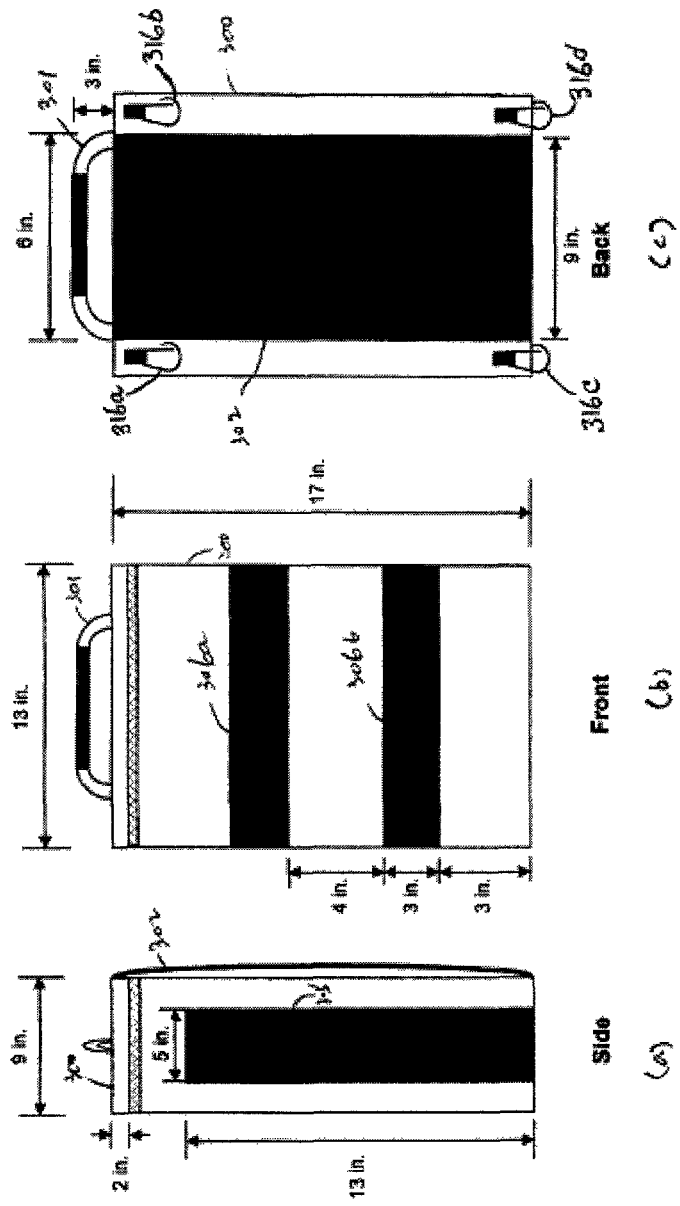
FIGS. 3(a)-3(c) show side, front and back panels of secondary bag 300, in accordance with one embodiment of the present invention.

FIGS. 3(a)-3(c) show side, front and back panels of secondary bag 300, in accordance with one embodiment of the present invention. As in primary bag 200, a rigid frame (e.g., rigid frame 100) is sewn between the outer material (e.g., lamb skin leather) and the waterproof (e.g., plastic) inside lining of secondary bag 300. In this embodiment, both side panels of secondary bag 300 are substantially the same. As shown in FIG. 3(c), secondary bag 300 includes handle 301 and material 302, which is attached along the top and bottom edges of the back panel of secondary bag 300 to create a cavity between material 302 and the back panel of the secondary bag 300. Material 302 is preferably lamb skin leather. Wrap-around straps 203a-203e of the primary bag 200 pass through the cavity behind material 302, so that secondary bag 300 may be secured on the passenger's back rest along with the primary bag, and thereby prevents secondary bag 300 from sliding in the direction of travel. Self-repairing zipper 304, which is provided across the front panel and the side panels of secondary bag 300, allows access to the inside of secondary bag 300 and secures its contents while in motion.

In this embodiment, both side panels of secondary bag 300 are substantially the same. As shown in FIG. 3(a), each side panel of secondary bag 300 is provided side-strap 305 for securing one or more side pouches to the side panel. As shown in FIG. 3(b), on the front 35 panel, front-straps 306a and 306b are provided to secure front pouches. Side strap 305 and front-straps 306a and 306b are preferably made from webbing material. As shown in FIG. 3(c), a clip (316a, 316b, 316c, 316d) is provided at each corner of the back panel of the secondary bag 300 to help secure secondary bag 300 to a primary bag (e.g., primary bag 200 of FIGS. 2(a)-2(c)) and to prevent secondary bag 300 from rotating around the passenger's back rest. The clips are preferably made of metal.

Figure 4B:
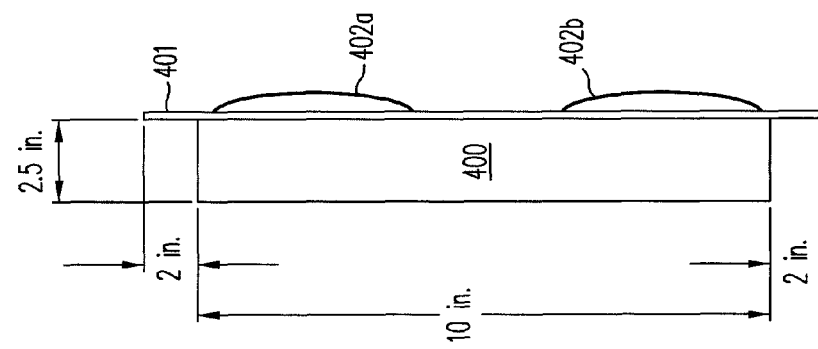
FIGS. 4(a)-4(b) show front and side views of a single front pouch, according to one embodiment of the present invention.
Figure 4A:
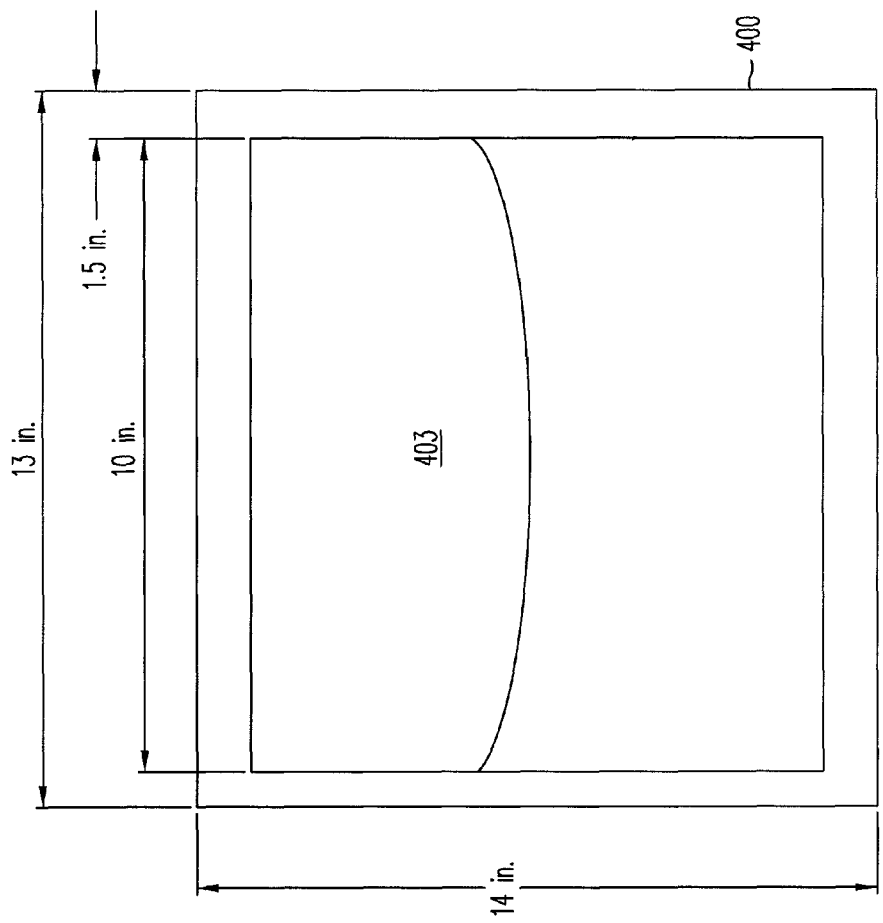

The front and side panels of the primary and the secondary bags are equipped to support additional pouches that may be attached. FIGS. 4(a)-4(b) show front and side views of single front pouch 400, according to one embodiment of the present invention. As shown in FIGS. 4(a) and 4(b), single front pouch 400 has dimensions 13 inches by 14 inches by 2.5 inches. Other suitable sizes are also possible. Single front pouch 400 may be attached to either a primary bag or a secondary bag. As shown in FIG. 4(b), back panel 401 of single front pouch 400 is provided by a stiff backing material (e.g., a stiff cowhide) on which solid pieces of material 402a and 402b (e.g., lamb skin leather) are attached. Each solid piece of material is attached to back panel 401 along its top and bottom edges to create a cavity between the material and back panel 401 through which one of front-straps of the primary or secondary bag (e.g., 206a or 206b of primary bag 200, or 306a or 306b of secondary bag 300) may pass through to secure front pouch 400 to the primary or secondary bag. Flap 403 is provided to cover single compartment 404 and to provide access to the inside of front pouch 400, which is preferably lined by a waterproof plastic material.

Figures 5A, 5B:
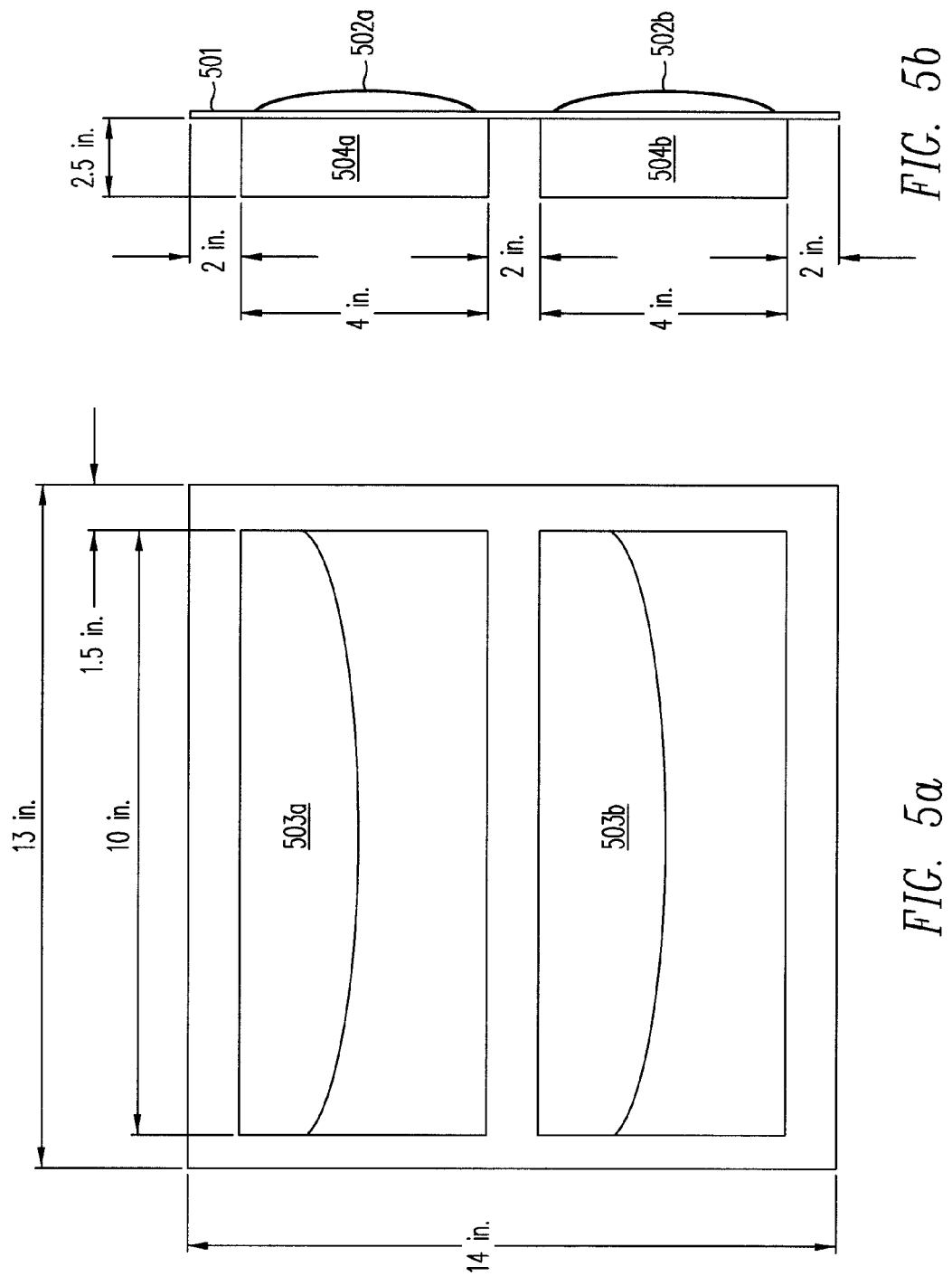
FIGS. 5(a)-5(b) show front and side views of a dual-compartment front pouch, according to one embodiment of the present invention.

FIGS. 5(a) and 5(b) show front and side views of dual-compartment front pouch 500, according to one embodiment of the present invention. As shown in FIGS. 5(a) and 5(b), dual-compartment front pouch 500 includes compartments 504a and 504b. Front pouch 500 may be attached to either a primary bag or a secondary bag. As shown in FIG. 5(b), back panel 501 of front pouch 500 is provided by a stiff backing material (e.g., a stiff cowhide) on which solid pieces of material 502a and 502b (e.g., lamb skin leather) are attached. Each solid piece of material is attached to back panel 501 along its top and bottom edges to create a cavity between the material and back panel 501 through which one of front-straps of the primary or secondary bag (e.g., 206a or 206b of primary bag 200, or 306a or 306b of secondary bag 300) may pass through to secure front pouch 500 to the primary or secondary bag. Flaps 503a and 503b are provided to cover and to provide access to the inside each of compartments 504a and 504b of front pouch 500, which is preferably lined by a waterproof plastic material.

Figure 6C:
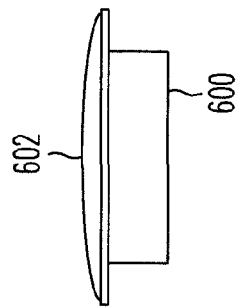
FIGS. 6(a)-6(c) show front, side and top views of single-component side pouch 600, according to one embodiment of the present invention.
Figure 6B:
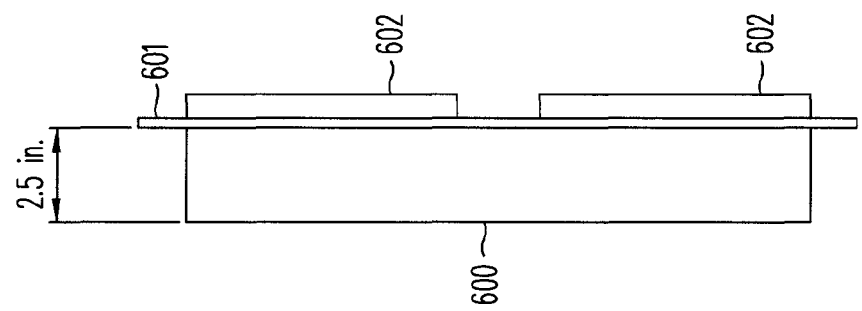
Figure 6A:
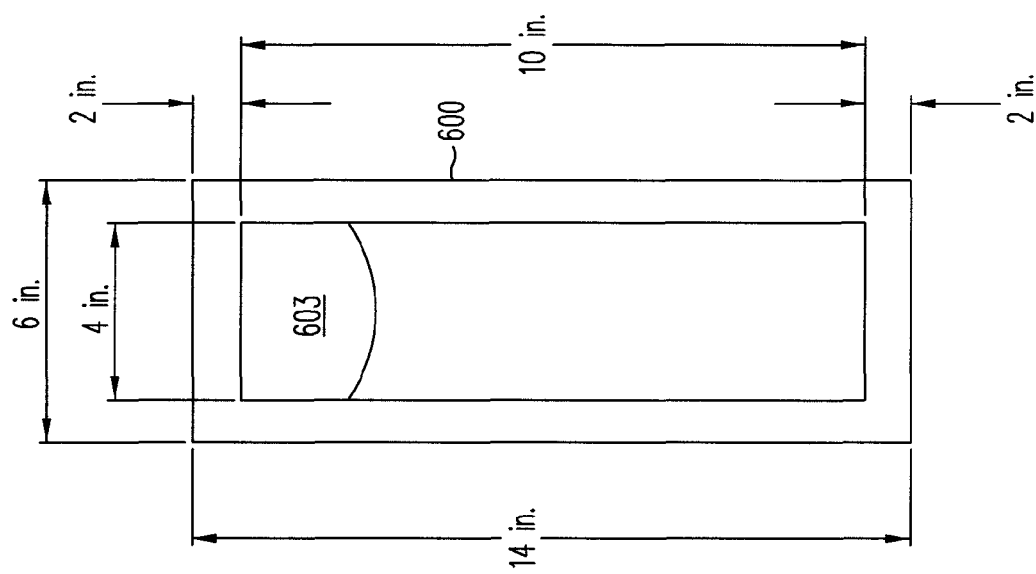

FIGS. 6(a)-6(c) show front, side and top views of single-compartment side pouch 600, according to one embodiment of the present invention. Side pouch 600 had dimensions 6 inches by 14 inches by 2.5 inches and may be attached to the side of either a primary bag or a secondary bag (e.g., primary bag 200 of FIG. 2 or secondary bag 300 of FIG. 3). Back panel 601 may be formed out of the same stiff backing material (e.g., cowhide) as the back panel 501 of FIG. 5(b). Solid piece of material 602 (e.g., lamb skin leather) is attached along the left and right edges of back panel 601 to create a cavity between material 602 and back panel 601, allowing a side-strap (e.g., side-strap 205 of FIG. 2 or side-strap 305 of FIG. 3) to pass through, so as to secure side pouch 600 to the side panel of a primary bag or a secondary bag. Flap 603 covers the top of the single compartment of side pouch 600 in order to safely secure the contents inside.

Figure 7C:
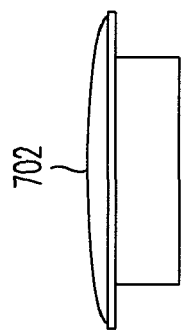
FIGS. 7(a)-7(c) show front, side and top views of dual-compartment side pouch 700, according to one embodiment of the present invention.
Figure 7B:
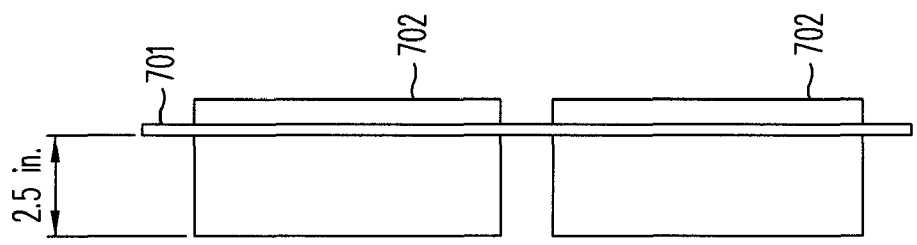
Figure 7A:
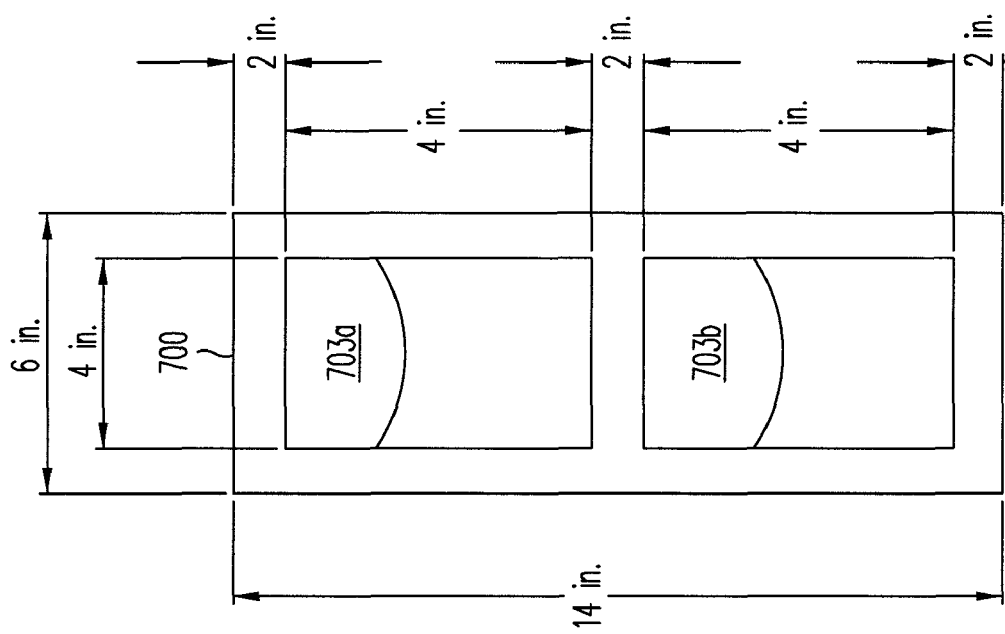

FIGS. 7(a)-7(c) show front, side and top views of dual-compartment side pouch 700, according to one embodiment of the present invention. Side pouch 700 may be attached to the side of either a primary bag or a secondary bag (e.g., primary bag 200 of FIG. 2 or secondary bag 300 of FIG. 3). Back panel 701 may be formed out of the same stiff backing material (e.g., cowhide) as the back panel 501 of FIG. 5(b). Solid piece of material 702 (e.g., lamb skin leather) is attached along the left and right edges of back panel 701 to create a cavity between material 702 and back panel 701, allowing a side-strap (e.g., side-strap 205 of FIG. 2 or side-strap 305 of FIG. 3) to pass through, so as to secure dual-compartment side pouch 700 to the side panel of a primary bag or a secondary bag. Flaps 703a and 703b cover the top and bottom compartments of side pouch 700 in order to safely secure the contents inside.

FIGS. 8(a)-8(c) show front, side and top views of cold-drink pouch 800, according to one embodiment of the present invention. Cold-drink pouch 800 may be attached to the side of either a primary bag or a secondary bag (e.g., primary bag 200 of FIG. 2 or secondary bag 300 of FIG. 3). Back pane 801 may be formed out of the same stiff backing material (e.g., cowhide) as the back panel 501 of FIG. 5(b). Solid piece of material 802 (e.g., lamb skin leather) is attached along the left and right edges of back panel 801 to create a cavity between material 802 and back panel 801, allowing a side-strap (e.g., side-strap 205 of FIG. 2 or side-strap 305 of FIG. 3) to pass through, so as to attach cold-drink pouch 800 to the side panel of a primary bag or a secondary bag. Self-repairing zipper 805 is provided at near the top of cold-drink pouch 800 along the top surface and the side surfaces to provide access to contents of cold-drink pouch 800. The inside of cold-drink pouch 800 may be lined by a waterproof plastic and thermally insulated from the outside.

The above detailed description is provided to illustrate specific embodiments of the present invention and is not intended to be limiting. Numerous variations and modifications of the present invention are possible. The present invention is set forth in the accompanying claims.

I claim:

1. A baggage system to be secured to a luggage rack and a back rest of a passenger's seat of a motorcycle, comprising:
   a first bag comprising:
      an exterior covering material;
      an interior lining;
      a rigid frame providing structural support for the first bag, the rigid frame comprising metallic rods provided between the exterior covering material and the interior lining;
      a plurality of anchor-straps provided at a lower part of the first bag for attaching the first bag to the luggage rack;
      a plurality of wrap-around straps provided on a first surface of the exterior covering material at predetermined positions such that, when the anchor-straps are attached to the luggage rack, the wrap-around straps are positioned to secure the first bag to the back rest;
      a plurality of fasteners attached to the first surface of the exterior covering material; and one or more fasteners provided on a second surface of the exterior covering material opposite the first surface for securing one or more removable pouches; and a second bag comprising:
an exterior covering material;
an interior lining;
a rigid frame providing structural support for the second bag, the rigid frame comprising metallic rods provided between the exterior covering material and the interior lining;
attachments provided on the exterior covering material positioned for engaging the fasteners on the first surface of the first bag, whereby the attachments secure the second bag to the first bag to help prevent the second bag from rotating around the back rest; and
a second exterior covering material attached to the exterior covering material of the second bag, the second exterior covering material providing a cavity between itself and the exterior covering material of the second bag that are positioned to allow at least one of the wrap-around straps to thread therethrough, whereby the wrap-around straps secure simultaneously both the first bag and the second bag to the back rest to help prevent the second bag from sliding in the direction of travel.

2. A baggage system as in claim 1, wherein the fasteners on the first bag comprise rings and the attachments on the second bag comprise clips.

3. A baggage system as in claim 1, further comprising a handle for the first bag.

4. A baggage system as in claim 1, a zipper that secures the contents inside the first bag.

5. A baggage system of claim 1, wherein each of the removable pouches include one or more compartments.

6. A baggage system as in claim 1, wherein the exterior covering material of each of the first and second bags each comprise lamb skin leather.

7. A baggage system as in claim 1, wherein the fasteners on the second surface of the first bag comprise webbing material.

8. A baggage system as in claim 1, further comprising:
one or more removable side pouches; and
one or more fasteners on a side of the first bag for securing the one or more removable side pouches to the first bag.

9. A baggage system as in claim 8, wherein each of the removable side pouches includes one or more compartments.

10. A baggage system as in claim 8, wherein the removable side pouches comprise a cold-drink pouch.

11. A baggage system as in claim 8, wherein one or more of the side-fasteners in the first bag comprise webbing material.

12. A baggage system as in claim 1, wherein the second bag further comprises one or more fasteners on a front side for securing one or more side pouches to the second bag.

13. A baggage system as in claim 12, wherein one or more of the fasteners on the front side of the second bag comprise webbing material.

14. A baggage system as in claim 1, wherein the second bag further comprises one or more fasteners on one side for securing one or more side pouches to the second bag.

15. A baggage system as in claim 14, wherein one or more of the side-fasteners in the second bag comprise webbing material.

* * * * *